United States Patent
Miki et al.

(10) Patent No.: US 6,635,356 B2
(45) Date of Patent: Oct. 21, 2003

(54) PACKAGING POLYESTER FILM

(75) Inventors: Takatoshi Miki, Mie-ken (JP); Takeshi Sugie, Mie-ken (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 09/735,376

(22) Filed: Dec. 12, 2000

(65) Prior Publication Data

US 2002/0168493 A1 Nov. 14, 2002

(30) Foreign Application Priority Data

Dec. 14, 1999 (JP) .......................................... 11-354089
May 22, 2000 (JP) ...................................... 2000-149261
Aug. 10, 2000 (JP) ...................................... 2000-242024

(51) Int. Cl.$^7$ ................................................ B32B 9/00
(52) U.S. Cl. ..................................................... 428/480
(58) Field of Search ..................... 428/480, 43; 238/113

(56) References Cited

U.S. PATENT DOCUMENTS

| | | | | | |
|---|---|---|---|---|---|
| 4,908,277 | A | * | 3/1990 | Tsunashima et al. | 428/480 |
| 5,045,580 | A | * | 9/1991 | Kitamura | 524/147 |
| 5,188,395 | A | * | 2/1993 | Kawahara et al. | 238/113 |
| 5,288,781 | A | * | 2/1994 | Song et al. | 711/171 |
| 5,616,387 | A | * | 4/1997 | Aust et al. | 428/43 |
| 6,040,035 | A | * | 3/2000 | Satoh et al. | 428/195 |
| 6,254,996 | B1 | * | 7/2001 | Fukuda et al. | 428/480 |

* cited by examiner

Primary Examiner—William P. Watkins, III
Assistant Examiner—Jane J Rhee
(74) Attorney, Agent, or Firm—David G. Conlin; John B. Alexander; Edwards & Angell, LLP

(57) ABSTRACT

The present invention relates to a polyester film for medicine wrapper or powder food wrapper having a surface resistivity of not more than $5 \times 10^{12}$ $\Omega/cm^2$.

21 Claims, No Drawings

PACKAGING POLYESTER FILM

BACKGROUND OF THE INVENTION

The present invention relates to a packaging polyester film. More particularly, it relates to a packaging polyester film which is capable of preventing attachment thereto of the substances wrapped up thereby such as medicines and powdered foods as well as other extraneous matter while increasing visual recognizability of the wrapped-up substance, and also has good printing ink adhesion irrespective of the type of ink.

Biaxially oriented polyester films represented by polyethylene terephthalate films have been used as base material of a variety of industrial products such as information recording devices, capacitors, packages, printing plates, insulators, photographic films, etc. because of their excellent mechanical and electrical properties, chemical resistance, dimensional stability and other advantageous properties.

Recently, polyester films are used as various types of packaging films by making use of their excellent properties. Amidst the increasing recognition of the importance of environmental problems, the scope of use of the polyester films are expected to widen as they can restrain environmental contamination in disposal of their wastes.

The packaging polyester films are finding their way into a broader scope of use; they are needed indeed in the various industrial fields including foods, electric and electronic parts, machinery, equipment, building materials and medicines.

Especially in packaging of medicines and powder foods, the packaging material is required to have high-level properties in the various aspects of function as the quality of the content can exert a great deal of influence to the human body.

Hitherto, for wrapping of medicines in particular, there have been used composite wrapping materials comprising a laminate of various types of transparent plastic films, typically cellophane, so that the quality of the wrapped-up medicine may be visually recognizable from the outside of the wrap. This type of wrapping, however, has presented the hygienic problems; for example, if an extraneous matter is attached to the surface of the wrap of a medicine, when the medicine is taken out to transfer it into other container or put into the month, such extraneous matter might drop into the container or the mouth. There was also a possibility that when the medicine is taken out from the wrap, it could adhere to the surface of the wrap or to the human body, clothing or surroundings to soil them.

In the case of medicine wrapping paper using cellophane as base, such wrapping paper has a tint peculiar to cellophane, so that when the content is seen from the outside of the wrap, the color tone of the content may look different from real one or it may be found difficult to confirm the content in the wrap, making it unable to detect abnormalities such as change of color of the medicine.

For wrapping or packaging of powder foods, there have been used composite wrapping or packaging materials comprising a laminate of transparent plastic films so that the quality of the wrapped-up or packaged food may be visually recognized from the outside of the wrap or package. However, in case where the content is a substance which has a tendency to adhere to the packaging material, such as dried bonito or fish flour, the content may not be easily taken out of the package as the content sticks to its surface.

In the case of wrapping of a medicine or powder food, the wrapping material is required, on one hand, to have an adequate degree of proofness against break to maintain the content quality unchanged, but is also required, on the other hand, to be capable of being easily torn open so that the content may be easily taken of the wrap with bare hands. However, the wrapping material comprising a laminate of a conventional polyester film with other type of film can not be easily torn up with hands because of high film strength, making it unable to easily take out the content from the wrap.

Methods for improving the tear properties of the polyester film, such as incorporating a polyester copolymer or an olefin in the polyester film, have been proposed to make it easy to tear the film. Such easy-to-tear films, however, have the problem that the transparency of the film is excessively reduced due to the additive component, lowering visual recognizability of the content.

Further, there are the cases where the certain descriptions such as pharmaceutist's name, patient's name, product name, ingredient names, date of preparation, dosage, etc., are printed on the medicine or powder food packaging film, and in such cases, the packaging film is required to have good printing ink adhesion at its outermost layer.

As a present inventors' earnest studies to solve the above problem, it has been found that a polyester film having a specific surface resistivity is preferable for the polyester film for medicine wrapper and powder food wrapper.

The present invention has been attained on the basis of the above finding.

SUMMARY OF THE INVENTION

The object of the present invention is to provide a medicine and powdered food wrapping or packaging film which is proof against attachment of the content or extraneous matter, allows easy recognition of the content when viewed from the outside of the film, has good ink adhesion irrespective of the type of ink, and is easy to rip open.

To attain the above aim, in a first aspect of the present invention, there is provided a packaging polyester film having a surface resistivity of not more than $5 \times 10^{12}$ $\Omega/cm^2$.

In the second aspect of the present invention, there is provided a medicine wrapper comprising the polyester film as defined in the first aspect.

In the third aspect of the present invention, there is provided a powder food wrapper comprising the polyester film as defined in the first aspect.

DETAILED DESCRIPTION OF THE INVENTION

The "polyesters" referred to in the present invention are synonymous with the polymers having ester groups which can be obtained from the polycondensation of dicarboxylic acids and diols or hydroxycarboxylic acids. Examples of the dicarboxylic acids usable for the polycondensation include terephthatic acid, isophthalic acid, adipic acid, azelaic acid, sebacic acid, 2,6-naphthalenedicarboxylic acid, 1,4-cyclohexanedicarboxylic acid and the like. Examples of the diols include ethylene glycol, 1,4-butanediol, diethylene glycol, triethylene glycol, neopentyl glycol, 1,4-cyclohexanedimethanol, polyethylene glycol and the like. Examples of the hydroxycarboxylic acids include p-hydroxybenzoic acid, 6-hydroxy-2-naphthoic acid and the like.

Typical examples of such polymers are polyethylene terephthalate and polyethylene-2,6-naphthalate. These polymers may be homopolymers or ternary copolymers.

As the films of the present invention, the biaxially stretched films are preferably used for the reason of high strength and excellent dimensional stability, but it is also possible to use the non-stretched or at least monoaxially stretched polyester films.

The film of the present invention needs to have anti-static properties for preventing adhesion of the packaged substance such as medicine and powder food, dust in the ambience and other extraneous matter to the film surface. For this purpose, the polyester film of the present invention is specifically treated to have a surface resistivity of not more than $5\times10^{12}$ $\Omega/cm^2$, preferably not more than $1\times10^{12}$ $\Omega/cm^2$, more preferably not more than $5\times10^{11}$ $\Omega/cm^2$. If the surface resistivity of the film is more than $5\times10^{12}$ $\Omega/cm^2$, the packaged substance and ambient dust tend to adhere to the film.

The "powder foods" referred to in the present invention include any of the foods which are of a powdery state, for example dried bonito, fish flour, milk powder, powdered coffee and such. In more concrete terms, they are the powdered foods of such a degree of fineness that when they are passed through a 2.5-mesh screen, the remnants on the screen are not more than 50% by weight of the overall weight of the food.

Antistatic properties may be provided by incorporating an anti-static agent in the film or by coating the film surface with an anti-static agent.

Any type of anti-static agent can be used as far as it is capable of reducing surface resistivity of the film.

Examples of the anti-static agent used in the present invention include sodium alkylsulfonate and sodium alkylbenzenesulfonate, preferably sodium alkylsulfonate.

In case where an anti-static agent is incorporated in the base polyester film, it is essential that the surface resistivity of the outermost layer of the film is not more than $5\times10^{12}$ $\Omega/cm^2$. The amount of the anti-static agent incorporated in the base polyester film is usually 0.1 to 2% by weight, preferably 0.2 to 1% by weight based on the weight of the polyester film. If the said amount is too small, the effect of the anti-static may be poor and the required surface resistivity in the present invention may not be attained. If the said amount is too large, the haze of the polyester film of the present invention is too large, it may be difficult to recognize the content in the wrapper. The base polyester film may be either a single-layer film or a laminate film comprising two or more layers.

When the packaging film is torn open with hands to take out the content such as medicine or powder food, if the tearing resistance is high, the initial force of tearing will be strengthened, which may cause bursting of the package to scatter away the content, or the film may be torn not linearly but irregularly to cause partial scatter of the content. Also, it may be impossible to perform proper operations in opening the package, such as delicate adjustment of the opening area of the package so as to dispense an appropriate amount of the medicine, etc., in the package.

A solution to these problems is a cut-facilitating work according to which fine perforations are formed densely in the film to facilitate propagation of tearing force from perforation to perforation so that the package may be easily ripped open with hands. This also allows desired adjustment of the shape and area of the opening. The cut-facilitating polyester film is especially preferably used as it can be easily torn open with empty hands.

Usually information relating to the content such as prescription, date of preparation, etc., in the case of a medicine, and commodity name, ingredients, etc., in the case of food, are printed on the packaging film surface. It is therefore preferable that the film surface has good ink adhesion. Ink adhesion of the film surface tends to lower proportionally to its wetting index. So, it is preferable that the film of the present invention has a surface tension of not less than 49 mN/m, more preferably not less than 51 mN/m, especially preferably not less than 53 mN/m. If the surface tension is too small, the film surface may not have good ink adhesion.

As a method for increasing the wetting index thereof, that is, increasing the surface tension, for example, there is a method in which easy-adhering agent such as polyethylene glycol and polytetramethylene glycol is blended into the polyester or a method in which the film surface is subject to corona treatment. If the wetting index thereof is too small, the film surface may not have good ink adhesion or the laminate strength may be poor.

It is also preferable that the packaging film can be seen through from the outside for confirmation of the content. A see-through package allows correct judgement of the content such as medicine from the outside, making it possible for anyone to easily confirm whether the medicine is the prescribed for him when he takes it. This also makes it possible to prevent erroneous medication or to easily confirm the dosage.

In view of the above, the haze of the polyester film of the present invention is preferably not more than 10%, more preferably not more than 8%, especially not more than 5%. If the haze is too large, it may be difficult to recognize the content in the wrapper.

As a method for reducing the haze thereof, for example, there is a method in which the amount of the particles added is reduced or a method in which the amount of anti-static agent blended is reduced while maintaining the surface resistivity of not more than $5\times10^{12}$ $\Omega/cm^2$.

According to the present invention, as described above, there is provided a medicine or powder food packaging film which is capable of preventing attachment of the content such as medicine and powder food or extraneous matter to the film surface, provides good recognizability of the content, has good ink adhesion irrespective of the ink type, and is easy to rip open.

EXAMPLES

The present invention will be explained in further detail with reference to the examples thereof, which examples however are merely intended to be illustrative and not to be construed as limiting the scope of the invention. The various properties and characteristics of the packaging film were determined or defined as described below. In the following Examples, all "percents (%)" are by weight unless otherwise noted.

(1) Surface Resistivity

The concentric circular electrodes (16008A) comprising a 50 mm$\phi$ inner electrode and a 70 mm$\phi$ outer electrode, manufactured by Yokokawa Hewlet Packard, Ltd., were set in the specimen under an atmosphere of 23° C. and 50% RH, then a voltage of 100 V was applied to the electrodes and the volumetric resistitivy of the specimen was measured by a high resistance meter manufactured by the same company.

(2) Wetting Index

A wetting index reagent (made by NACALAI TESQUE, INC.) was flown over the surface of the sample film and its wettability was determined according to JIS-K6768-1977.

(3) Haze

Film haze was measured by an integrating spherical turbidimeter NDH-20D (mfd. by Nippon Denshoku Kogyo KK) according to JIS-7105.

(4) Ink Adhesion

A printing ink CCST39 Indigo for cellocolor produced by Toyo Ink Mfd. Co., Ltd. was applied on the film surface to a coating thickness after drying of 1.5 μm and hot-air dried at 80° C. for one minute to obtain a test film for evaluation. Then a cellopane adhesive tape (18 mm wide) (Cellotape mfd. by Nichiban Co., Ltd.) was stuck to the ink applied side of the test film along a length of 7 cm with care so that no air cells wound be allowed to get in between the test film and the adhesive tape, and a predetermined load was given thereto by a 3 kg manual loading roll. A 500 g weight was attached to an end of the adhesive tape, and with the film fixed, the weight was let drop gravitationally through a distance of 45 cm, after which an 180° peel test was started. Ink adhesion was evaluated according to the following 5-point rating system.

5: There took place no separation of ink to the cellophane adhesive tape side.
4: Less than 10% of ink separated to the adhesive tape side.
3: 10 to 50% of ink separated to the adhesive tape side.
2: More than 50% of ink separated to the adhesive tape side.
1: Ink separated entirely to the adhesive tape side.

There is no problem for practical use if the evaluation marks are 4 or more.

(5) Content Recognizability

Each sample film was laminated on a polyethylene sheet so that the polyethylene sheet would come on the inside of the laminate, then the laminate was worked into a medicine wrapper, all by the conventional methods, and the content recognizability of the wrapper was evaluated according to the following criterion.

A: The wrapper had excellent transparency and allowed easy recognition of the content.
B: The wrapper allowed recognition of the content.
C: It was difficult with the wrapper to recognize the content.

(6) Easiness to Rip with Hands

Each sample medicine wrapper made in the same way as described in the above item (5) was subjected to a test on easiness of ripping with hands and evaluated according to the following criterion.

A: The wrapper could be easily ripped with hands.
B: The wrapper could not be easily ripped with hands.

(7) Ash Test

Cigarette ash was dropped onto the surface of each sample film and the film was swung to make a full turn (360°) vertically. The condition of adhesion of ash was observed and evaluated according to the following criterion.

A: Almost no ash adhered on the film.
B: Ash adhered slightly on the film.
C: Ash adhered in large quantities on the film.

(8) General Evaluation

Each of the above items was evaluated according to a 5-point system, and the test piece which got 3 or more marks was regarded acceptable.

Example 1

<Production of Polyester Chips>

100 parts of dimethyl terephthalate, 70 parts of ethylene glycol and 0.07 part of calcium acetate monohydrate were heated in a reactor while evaporating away methanol to carry out an ester exchange reaction, and the reaction mixture was further heated to 230° C. over a period of 4.5 hours after start of the reaction, at which point the ester exchange reaction was substantially completed.

Then 0.04 part of phosphoric acid and 0.035 part of antimony trioxide were added, and the mixture was polymerized in the usual way. That is, the reaction temperature was raised gradually until it finally reached 280° C. while the pressure was lowered gradually till finally reaching 0.05 mmHg. The reaction was completed 4 hours later, and the reaction product was made into chips in the usual way to obtain polyester (A). The solution viscosity IV of the thus obtained polyester chips was 0.66.

<Production of Anti-static Master Batch>

In the said polyester (A) was blended an anti-static agent sodium alkylsulfonate in an amount of 20% to prepare polyester (B).

Further, in the course of production of the said polyester (A), amorphous silica having an average particle size of 2 μm was added in an amount of 1,000 ppm to prepare polyester (C).

Also, in the course of production of the said polyester (A), polyethylene glycol (molecular weight: 6,000 was added in an amount of 10% to prepare polyester (D).

<Production of Polyester Film>

A 57/3/30/10 (%) mixture of the said polyesters (A), (B), (C) and (D), and polyester (A) were melted respectively at 295° C., and they were coextruded onto a cooled casting drum with the said mixture composing the outermost layer (surface layer) and the said polyester (A) forming the intermediate layer to constitute a 2-material, 3-layer structure, and cooled and solidified to obtain a non-oriented sheet. This sheet was stretched 3.6 times in the machine direction at 90° C., then preheated and stretched 4 times in the transverse direction at 90° C. by a tenter, and then heat treated at 230° C. for 10 seconds to obtain a 19 μm thick polyester film.

This polyester film was introduced in between a working roll having a scar forming projection on the circumference of a circle and a back-up roll having a smooth surface, said rolls being arranged to rotate at an equal speed in the opposite directions to each other, whereby the said polyester film was provided with fine perforations over its entire surface. This perforated film was then laminated with a polyethylene film to obtain a medicine wrapper with a polyester film as its base. This medicine wrapper showed excellent anti-static properties, content recognizability, easiness to rip with hands and ink adhesion.

Example 2

The same procedure as defined in Example 1 was conducted except that no fine perforations were provided in the polyester film to obtain a medicine wrapper, and its properties were evaluated in the same way as in Example 1.

Example 3

The same procedure as defined in Example 1 was conducted except that the amount of the surface layer polyester (D) blended was changed to 5% to obtain a medicine wrapper, and its properties were evaluated in the same way as in Example 1.

Example 4

The same procedure as defined in Example 1 was conducted except that the amount of the surface layer polyester (C) blended was changed to 40% to obtain a medicine wrapper, and its properties were evaluated in the same way as in Example 1.

Reference Example 1

The same procedure as defined in Example 1 was conducted except that polyesters (A), (B) and (C) alone were used as materials of the surface layer to obtain a medicine wrapper, and its properties were evaluated in the same way as in Example 1. The obtained wrapper was poor in ink adhesion and incapable of proper printing.

Reference Example 2

The same procedure as defined in Example 1 was conducted except for a change of the surface layer polyester (B) to obtain a medicine wrapper, and its properties were evaluated in the same way as in Example 1. The obtained wrapper had a high level of haze and offered difficulties in recognizing the content.

Comparative Example 1

The same procedure as defined in Example 1 was conducted except that polyesters (A), (C) and (D) were used as surface layer materials, and that no fine perforations were provided in the produced polyester film to obtain a medicine wrapper, and its properties were evaluated in the same way as in Example 1. The thus obtained wrapper was poor in anti-static effect and subject to adhesion of the content to its surface. This wrapper was also unsatisfactory in hand ripping quality.

The obtained results are shown collectively in Table 1 below.

TABLE 1

|  | Example 1 | Example 2 | Example 3 | Example 4 |
|---|---|---|---|---|
| Blending ratios of layer materials |  |  |  |  |
| A | 57 | 57 | 62 | 37 |
| B | 3 | 3 | 3 | 3 |
| C | 30 | 30 | 30 | 50 |
| D | 10 | 10 | 5 | 10 |
| Cut-facilitating work | Conducted | Not conducted | Conducted | Conducted |
| Surface resistivity ($\Omega/cm^2$) | $5 \times 10^{11}$ | $5 \times 10^{11}$ | $5 \times 10^{11}$ | $5 \times 10^{11}$ |
| Wetting index | 54 | 54 | 50 | 54 |
| Haze (%) | 3 | 3 | 3 | 5 |
| Ash test | A | A | A | A |
| Ink adhesion | 5 | 5 | 4 | 5 |
| Content recognizability | A | A | A | B |
| Easiness to rip with hands | A | B | A | A |
| General evaluation | 5 | 5 | 4 | 4 |

|  | Reference Example 1 | Reference Example 2 | Comparative Example 1 |
|---|---|---|---|
| Blending ratios of layer materials |  |  |  |
| A | 67 | 20 | 60 |
| B | 3 | 40 | 0 |
| C | 30 | 30 | 30 |
| D | 0 | 10 | 10 |
| Cut-facilitating work | Conducted | Conducted | Not conducted |
| Surface resistivity ($\Omega/cm^2$) | $5 \times 10^{11}$ | $2 \times 10^{11}$ | $2 \times 10^{14}$ |
| Wetting index | 42 | 54 | 54 |
| Haze (%) | 3 | 11 | 3 |
| Ash test | A | A | C |
| Ink adhesion | 2 | 5 | 5 |
| Content recognizability | A | C | A |
| Easiness to rip with hands | A | A | B |
| General evaluation | 3 | 3 | 1 |

Example 5

The same procedure as defined in Example 1 was conducted except that the film forming speed was changed to obtain a 12 μm thick polyester film.

After providing with fine perforations over the entire surface of the obtained film, this perforated film was then laminated with a polyethylene film and OPP film to obtain a powder food wrapper with a polyester film as its base. This powder food wrapper showed excellent anti-static properties, content recognizability, easiness to rip with hands and ink adhesion. Therefore, this powder food wrapper showed excellent properties for the powder food wrapper.

Example 6

The same procedure as defined in Example 5 was conducted except that no fine perforations were provided in the polyester film to obtain a powder food wrapper, and its properties were evaluated in the same way as in Example 5.

Example 7

The same procedure as defined in Example 5 was conducted except that the amount of the surface layer polyester (D) blended was changed to 5% to obtain a powder food wrapper, and its properties were evaluated in the same way as in Example 5.

Example 8

The same procedure as defined in Example 5 was conducted except that the amount of the surface layer polyester (C) blended was changed to 40% to obtain a powder food wrapper, and its properties were evaluated in the same way as in Example 5.

Reference Example 3

The same procedure as defined in Example 5 was conducted except that polyesters (A), (B) and (C) alone were used as materials of the surface layer to obtain a powder food wrapper, and its properties were evaluated in the same way as in Example 5. The obtained wrapper was poor in ink adhesion and incapable of proper printing.

Reference Example 4

The same procedure as defined in Example 5 was conducted except for a change of the surface layer polyester (B) to obtain a powder food wrapper, and its properties were evaluated in the same way as in Example 5. The obtained wrapper had a high level of haze and offered difficulties in recognizing the content.

Comparative Example 2

The same procedure as defined in Example 5 was conducted except that polyesters (A), (C) and (D) were used as surface layer materials, and that no fine perforations were provided in the produced polyester film to obtain a powder food wrapper, and its properties were evaluated in the same way as in Example 5. The thus obtained wrapper was poor in anti-static effect and subject to adhesion of the content to its surface. This wrapper was also unsatisfactory in hand ripping quality.

The obtained results are shown collectively in Table 2 below.

TABLE 2

|  | Example 7 | Example 8 | Example 9 | Example 10 |
|---|---|---|---|---|
| Blending ratios of layer materials | | | | |
| A | 57 | 57 | 62 | 37 |
| B | 3 | 3 | 3 | 3 |
| C | 30 | 30 | 30 | 50 |
| D | 10 | 10 | 5 | 10 |
| Cut-facilitating work | Conducted | Not conducted | Conducted | Conducted |
| Surface resistivity ($\Omega/cm^2$) | $5 \times 10^{11}$ | $5 \times 10^{11}$ | $5 \times 10^{11}$ | $5 \times 10^{11}$ |
| Wetting index | 54 | 54 | 50 | 54 |
| Haze (%) | 3 | 3 | 3 | 5 |
| Ash test | A | A | A | A |
| Ink adhesion | 5 | 5 | 4 | 5 |
| Content recognizability | A | A | A | B |
| Easiness to rip with hands | A | B | A | A |
| General evaluation | 5 | 5 | 4 | 4 |

|  | Reference Example 3 | Reference Example 4 | Comparative Example 2 |
|---|---|---|---|
| Blending ratios of layer materials | | | |
| A | 67 | 20 | 60 |
| B | 3 | 40 | 0 |
| C | 30 | 30 | 30 |
| D | 0 | 10 | 10 |
| Cut-facilitating work | Conducted | Conducted | Not conducted |
| Surface resistivity ($\Omega/cm^2$) | $5 \times 10^{11}$ | $2 \times 10^{11}$ | $2 \times 10^{14}$ |
| Wetting index | 42 | 54 | 54 |
| Haze (%) | 3 | 11 | 3 |
| Ash test | A | A | C |
| Ink adhesion | 2 | 5 | 5 |
| Content recognizability | A | C | A |
| Easiness to rip with hands | A | A | B |
| General evaluation | 3 | 3 | 1 |

What is claimed is:

1. A packaging polyester film having a surface resistivity of not more than $5 \times 10^{12}$ $\Omega/cm^2$ under an atmosphere of 23° C. and 50% RH, and a wetting index of not less than 53 mN/m.

2. A packaging polyester film according to claim 1 having a wetting index of not less than 54 mN/m.

3. A packaging polyester film according to claim 1 having a haze of not more than 10%.

4. A packaging polyester film according to claim 1, wherein said film has been subjected to a cut-facilitating work.

5. A packaging polyester film according to claim 1, wherein said film contains an anti-static agent.

6. A packaging polyester film according to claim 5, wherein said anti-static agent is selected from the group consisting of sodium alkylsulfonate and sodium alkylbenzenesulfonate.

7. A packaging polyester film according to claim 5, wherein the content of said anti-static agent is 0.1 to 2% by weight based on the weight of polyester film.

8. A medicine wrapper comprising the polyester film as defined in claim 1.

9. A powder food wrapper comprising the polyester film as defined in claim 1.

10. The packaging polyester film according to claim 1 further comprising at least one polyethylene glycol as a component of the polyester film.

11. A medicine wrapper or powder food wrapper comprising a medicine or a powder food and a wrapper composed of a polyester film having a surface resistivity of not more than $5 \times 10^{12}$ /cm².

12. The medicine wrapper or powder food wrapper of claim 11, wherein said polyester film has a wetting index of not less than 49 mN/m.

13. The medicine wrapper or powder food wrapper of claim 11, wherein said polyester film has a wetting index of not less than 53 mN/m.

14. The medicine wrapper or powder food wrapper of claim 11, wherein said polyester film has a wetting index of not less than 54 mN/m.

15. The medicine wrapper or powder food wrapper of claim 11, wherein said polyester film has a haze of not more than 10%.

16. The medicine wrapper or powder food wrapper of claim 11, wherein said polyester film has been subjected to a cut-facilitating work.

17. The medicine wrapper or powder food wrapper of claim 11, wherein said polyester film contains an anti-static agent.

18. The medicine wrapper or powder food wrapper of claim 17, wherein said anti-static agent is selected from the group consisting of sodium alkylsulfonate and sodium alkylbenzenesulfonate.

19. The medicine wrapper or powder food wrapper of claim 17, wherein the content of said anti-static agent is 0.1 to 2% by weight based on the weight of polyester film.

20. A packaging polyester film according to claim 1, wherein the surface resistivity under an atmosphere of 23° C. and 50% RH is not more than $1 \times 10^{12}$ $\Omega/cm^2$.

21. A packaging polyester film according to claim 1, wherein the surface resistivity under an atmosphere of 23° C. and 50% RH is not more than $1 \times 10^{11}$ $\Omega/cm^2$.

* * * * *